A. ATWOOD.

Car Wheel.

No. 497. Reissued Sept. 22, 1857.

AM. PHOTO-LITHO. CO. N.Y. (OSBORNE'S PROCESS.)

UNITED STATES PATENT OFFICE.

ANSON ATWOOD, OF TROY, NEW YORK.

IMPROVEMENT IN CAST-IRON CAR-WHEELS.

Specification forming part of Letters Patent No. 5,112, dated May 15, 1847; Reissue No. 497, dated September 22, 1857.

*To all whom it may concern:*

Be it known that I, ANSON ATWOOD, of Troy, in the county of Rensselaer and State of New York, have invented a new and useful Improvement in Cast-Iron Wheels for Railroad-Carriages; and I do hereby declare that the following is a full, clear, and exact description of the principle or character which distinguishes it from all other things before known, and of the manner of making, constructing, and using the same, reference being had to the accompanying drawings, making part of this specification, in which—

Figure 2:
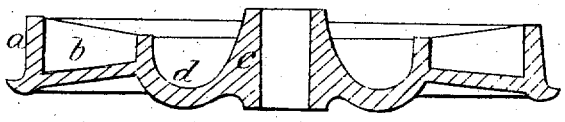
Figure 1:
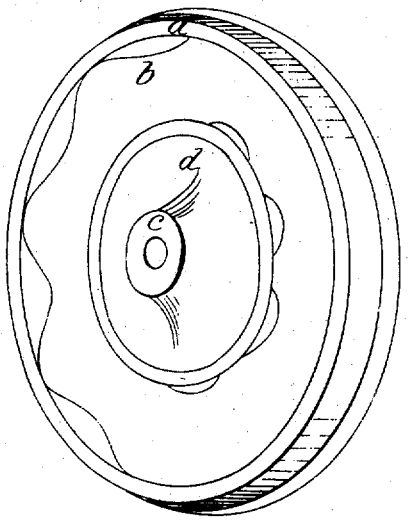
Figure 3:
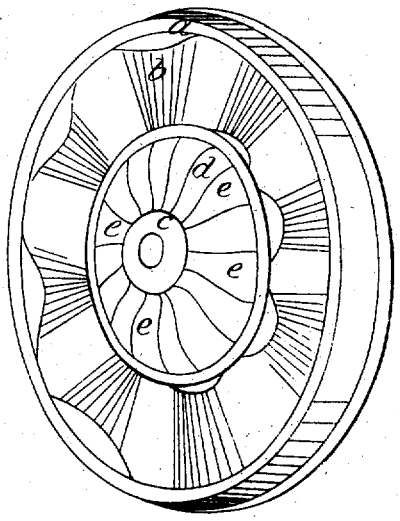
Figure 4:
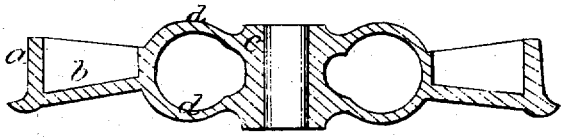

Figure 1 is a perspective representation of a wheel on my improved plan; Fig. 2, a section thereof through the axis. Figs. 3 and 4 represent a modification of the same invention.

The object of my invention is to construct a wheel, to be cast in one piece, with a solid hub, that will not be liable to break in any of its parts from undue strain upon the metal arising from the contraction of the chilled rim cooling before the hub and disk; and it consists in connecting the rim with the hub by means of a waved plate, forming a series of curves from one edge of the rim to the other, entirely around, and extending to about midway between the rim and the hub, where it connects with a hollow ring, surrounding and connecting it with the hub. This gives support to the whole width of the rim or tread, and is capable of yielding both in the direction of its circumference and diameter without strain on the metal from the contraction of the plate and hub in cooling after the rim.

In the accompanying drawings, A represents the rim of the wheel, of the usual form; and B, a plate, which is made in a succession of waves passing entirely around by a series of curves from one edge to the other, so that after the rim has been set by the chill and the plate begins to cool and contract the waved surface will yield in the direction of the circumference without producing an injurious strain on the metal. The inner periphery of this plate is connected with the solid hub C by a concave and convex flange, D, the cross-sections of which, taken in planes passing through the axis of the hub, will present segments of circles extending from the hub to the waved plate B, so as to yield to the contraction in the direction of the radii. This concave and convex flange D is, in fact, a continuation of the solid hub, which gradually curves to form the connection with the waved plate.

Instead of one concave and convex flange-like projection or concave ring, D, such as above described, there may be two, one for each face of the wheel, as represented in Fig. 4; and if desired to afford facility for removing the core after the wheel has been cast one or both of the flanges or concave and convex rings D may be made with openings E, as shown in Fig. 3.

What I claim as my invention, and desire to secure by Letters Patent, is—

Connecting the rim of a wheel cast in one piece with a solid hub by means of a single-waved plate, in combination with the dished flange or flanges of the hub, forming a ring concentric with the rim of the wheel, substantially as described, whereby the several parts can yield to the unequal contraction in all directions without serious strain of the metal.

ANSON ATWOOD.

Witnesses:
W. LESKI,
WM. M. SMITH.